Feb. 20, 1923.

G. L. HILLS.
ILLUMINATED LIQUID GAUGE.
FILED JULY 2, 1921.

1,445,834.

Inventor
G. L. Hills.

By Watson E. Coleman
Attorney

Patented Feb. 20, 1923.

1,445,834

UNITED STATES PATENT OFFICE.

GEORGE LEONARD HILLS, OF FRANKLIN, ILLINOIS.

ILLUMINATED LIQUID GAUGE.

Application filed July 2, 1921. Serial No. 482,239.

*To all whom it may concern:*

Be it known that I, GEORGE LEONARD HILLS, a citizen of the United States, residing at Franklin, in the county of Morgan and State of Illinois, have invented certain new and useful Improvements in Illuminated Liquid Gauges, of which the following is a specification, reference being had to the accompanying drawings.

This invention relates to liquid gauges such as are used on the fuel tanks of automobiles and in like situations, and the general object of the invention is to provide means whereby the gauge may be illuminated.

A further object is to provide a gauge of this character with a vertically disposed gauge glass, and provide means whereby an electric light may be mounted behind the gauge glass so that the light from the lamp will shine through the glass and show plainly the level of the liquid in the gauge.

And a further object is to provide a liquid gauge and an electric light socket holder as a unit.

Still another object is to provide an attachment whereby an electric light may be clamped behind the usual gauge glass of automobile fuel tanks, the clamp being adapted to embrace the holder of the gauge glass.

Other objects will appear in the course of the following description.

My invention is illustrated in the accompanying drawings, wherein:—

Figure 1:
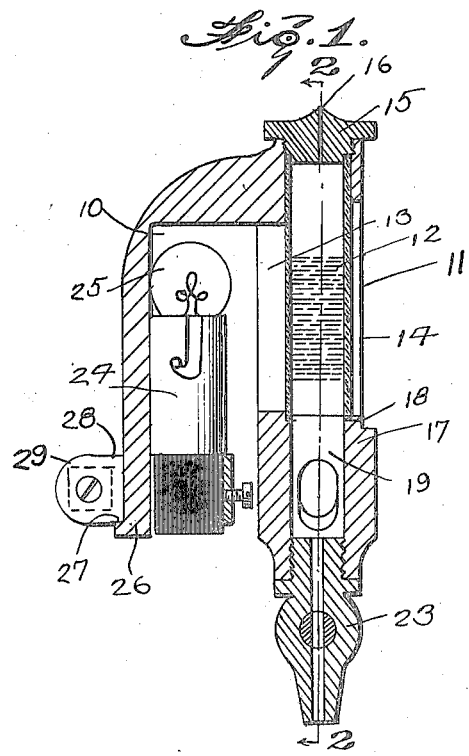
Figure 1 is a longitudinal sectional view of an illuminated gauge glass constructed in accordance with one embodiment of my invention.
Figure 2:
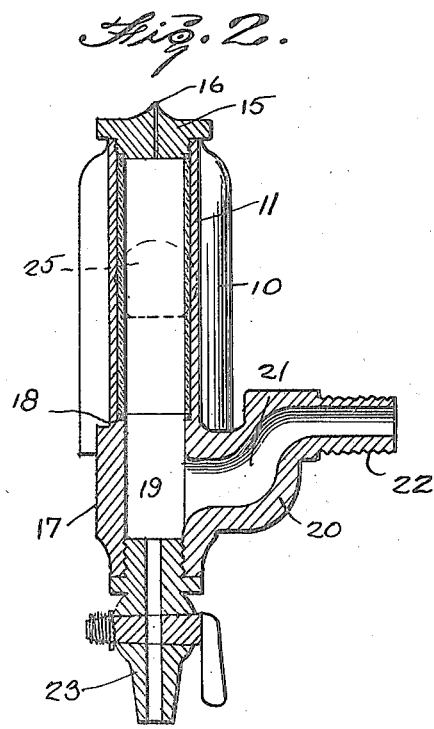
Figure 2 is a sectional view on the line 2—2 of Figure 1.
Figure 3:
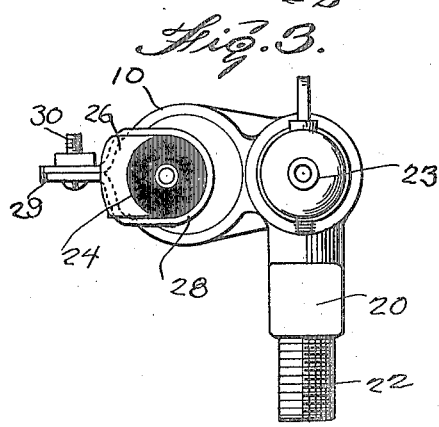
Figure 3 is an under side plan view of the construction shown in Figure 1.
Figure 4:
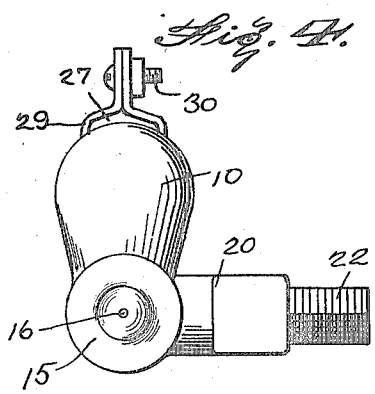
Figure 4 is a top plan view of the construction as illustrated in Figure 2;.

In the drawings, I have illustrated a preferred form of my invention, and in this form it will be seen from the drawings that I have provided a casting formed to provide a chamber 10 open at its bottom and within which an electric light may be disposed, and a longitudinally extending chamber 11 having a length approximately the same as that of the chamber 10, within which the usual gauge glass 12 may be inserted. The wall between the chambers 10 and 11 is longitudinally slotted as at 13, and the wall of the chamber 11 opposite this slot is longitudinally slotted, as at 14, to provide an opening through which the gauge glass may be seen.

The upper end of the chamber 11 is interiorly screw-threaded for engagement with a cap 15 which is provided with a small vent opening 16. The lower end of the chamber 11 is downwardly extended, as at 17, there being a seat 18 between the interior of this downward extension and the chamber 11 upon which the gauge glass may be disposed, this gauge glass being insertible through the top of the chamber 11. The extension 17 has a chamber 19 and extending laterally from the chamber 17 is an angular portion 20 formed with a duct 21 communicating with the interior of the chamber 19. The portion 20 has a nipple 22 whereby connection may be made from the supply tank of the automobile to the gauge glass. The lower end of the portion 17 is formed to permit a pet cock 23 to be connected to the portion 17.

Adapted to be disposed within the chamber 10 is an electric lamp socket 24 adapted to hold a small electric lamp 25. The rear wall of the chamber 10 is formed with a downward extension 26 having upon its outer face a shoulder 27, and a clamp 28 is adapted to surround the lower end of the socket 24 and the lug 26 and rest upon this shoulder 27. This clamp may be of any suitable character and is illustrated as a split ring having parallel projecting lugs 29 through which a bolt 30 passes.

As before remarked, the parts 10 and 11 will preferably be cast or otherwise formed from one piece of metal and the portion 20 will be preferably formed in one piece with the member 19. I do not wish to be limited, however, to this. It is obvious that the cap 15 will close the upper end of the gauge glass 12 and hold the lower end of the gauge glass firmly to its seat, which, of course, may be provided with suitable gaskets so that any liquid in a tank connected to the nipple 22 will rise in the gauge glass to a height equal to the level of the liquid in the tank. The electric lamp 25 will be connected in circuit with a switch so that it may be turned off or on and thus the level of the liquid in the gauge glass may be readily seen.

It will be seen that with this device the gauge glass may be readily illuminated at any time desired by a bulb placed behind the gauge glass so that the level of the liquid may be plainly seen. Ordinarily it is quite difficult to note the level of the liquid in the gauge glass with any degree of accuracy because the gauge glass is usually disposed in a position which renders its easy reading a very difficult matter.

It will be seen that my device may be readily and cheaply made and may be readily put in place in the car, and that it is effective for the purpose intended.

While my invention is particularly designed for the gauge glasses of automobile fuel tanks and that I have particularly described a form of gauge which is adapted for this purpose, I do not wish to be limited to the application of my invention to gauge glasses of this character, as it is obvious that it may be applied to any gauge glass.

I claim:—

1. As an article of manufacture, an illuminated gauge comprising a tubular body open at its opposite ends and having longitudinally extending slots and formed on its interior to provide a gauge glass seat and at the opposite end having a screw-threaded opening larger in diameter than the gauge glass, the body below the seat having a lateral tubular extremity and below the seat being screw-threaded to receive a petcock, the body being formed with an integral lamp housing open at one end, with the interior of which one of the longitudinal slots communicates, a gauge glass disposed on the gauge glass seat, a cap detachably engaging and closing the open end of the tubular body and holding the gauge glass in place, and means associated with the lamp housing for holding an electric lamp therein.

2. As an article of manufacture, an illuminated gauge comprising a tubular body open at its opposite ends and having longitudinally extending slots and formed on its interior to provide a gauge glass seat and at the opposite end having a screw-threaded opening larger in diameter than the gauge glass, the body below the seat having a lateral tubular extremity and below the seat being screw-threaded to receive a petcock, the body being formed with an integral lamp housing open at its lower end, with the interior of which one of the longitudinal slots communicates, a gauge glass disposed on the gauge glass seat, a cap closing the open end of the tubular body and holding the gauge glass in place, and means associated with the lamp housing and connected to the exterior of the body for holding an electric lamp within the housing.

In testimony whereof I hereunto affix my signature.

GEORGE LEONARD HILLS.